United States Patent
Andleman et al.

(10) Patent No.: US 9,747,339 B2
(45) Date of Patent: Aug. 29, 2017

(54) SERVER-BASED MANAGEMENT FOR QUERYING EVENTUALLY-CONSISTENT DATABASE

(71) Applicant: GetGo, Inc., Boston, MA (US)

(72) Inventors: John S. Andleman, Camarillo, CA (US); Albrecht Beyle, Karlsruhe (DE); Mark Andrew Bishop, Newburyport, MA (US); Paul Douglas Fife, Lompoc, CA (US); Gerald Kleser, Karlsruhe (DE)

(73) Assignee: GetGo, Inc., Boston, MA (US)

( * ) Notice: Subject to any disclaimer, the term of this patent is extended or adjusted under 35 U.S.C. 154(b) by 201 days.

(21) Appl. No.: 14/730,475

(22) Filed: Jun. 4, 2015

(65) Prior Publication Data
US 2016/0357806 A1    Dec. 8, 2016

(51) Int. Cl.
*G06F 17/30* (2006.01)
(52) U.S. Cl.
CPC .. *G06F 17/30477* (2013.01); *G06F 17/30283* (2013.01); *G06F 17/30371* (2013.01); *G06F 17/30545* (2013.01); *G06F 17/30578* (2013.01)

(58) Field of Classification Search
None
See application file for complete search history.

(56) References Cited

U.S. PATENT DOCUMENTS

| | | | |
|---|---|---|---|
| 9,390,131 B1 * | 7/2016 | Fuller | G06F 17/30477 |
| 9,613,104 B2 | 4/2017 | Smith et al. | |
| 2015/0074063 A1 | 3/2015 | Hugg | |
| 2016/0275085 A1 | 9/2016 | Soundararajan et al. | |

* cited by examiner

*Primary Examiner* — William Spieler
(74) *Attorney, Agent, or Firm* — BainwoodHuang (57) ABSTRACT

A technique for managing access to a distributed database includes providing a server configured to receive database requests from client machines over a network. The server intelligently responds to a database request by (i) sending a first query to the distributed database at a lower consistency level to obtain a first response and (ii) conditionally sending a second query to the distributed database at a higher consistency level to obtain a second response. The server sends the second query conditionally based on whether the first response meets a plausibility condition specified in the database request. If the first response meets the plausibility condition, the server returns the first response to the client to satisfy the database request and no second query is sent. Otherwise, the server sends the second query to the distributed database and returns the second response to the client.

20 Claims, 5 Drawing Sheets

SERVER-BASED MANAGEMENT FOR QUERYING EVENTUALLY-CONSISTENT DATABASE

BACKGROUND

Computing applications deployed over networks, such as the Internet, often use distributed databases for hosting application-related data. A distributed database is a data store that includes multiple database nodes, generally deployed across multiple locations. The nodes operate in a decentralized yet coordinated manner. A distributed database can provide high availability and fault tolerance, such that any one node can suffer a failure without the database as a whole losing data or functionality. Well-known examples of distributed databases include Apache Cassandra (open source), Voldemort (open source), and Amazon DynamoDB, for example.

Clients of distributed databases can direct commands, such as Create, Read, Update, and Delete (CRUD), to one or more database nodes, with the nodes coordinating to service the commands. For example, a client may send a data update command to one node of the distributed database, and that node may propagate the update to other nodes over time. Likewise, a client may direct a read query to one node. The query may specify a number or percentage of database nodes to check for the requested data. The distributed database coordinates access to the specified number or percentage of nodes and returns a response to the client. The response generally includes the most recent version of the requested data found among the accessed nodes.

Owing to the decentralized nature of certain distributed databases, data written to one node is not always available immediately from other nodes. This is especially the case for so-called "eventually-consistent" databases, such as "AP" databases, which provide guaranteed levels of Availability and tolerance to network Partitioning, but no guaranteed level of consistency. Indeed, the CAP Theorem states that it is impossible for a distributed computing system to guarantee Consistency, Availability, and Partition tolerance all at the same time.

SUMMARY

Unfortunately, distributed databases can place particular burdens on client machines and their programmers. For example, a client machine programmed to obtain information from a distributed database conventionally has to choose between (a) submitting a lower-consistency, but relatively efficient, query directed to a small number or percentage of database nodes and (b) submitting a higher-consistency, but relatively inefficient, query directed to a large number or percentage of database nodes. Clients are thus faced with a tradeoff between performance and the risk of receiving stale data. Although clients can develop countermeasures to cope with stale data, such countermeasures place additional burdens on both client machines and their programmers.

In contrast with the above-described approach, an improved technique for managing access to a distributed database includes providing a server configured to receive database requests from client machines over a network. The server intelligently responds to a database request by (i) sending a first query to the distributed database at a lower consistency level to obtain a first response and (ii) conditionally sending a second query to the distributed database at a higher consistency level to obtain a second response. The server sends the second query conditionally based on whether the first response meets a plausibility condition specified in the database request. If the first response meets the plausibility condition, the server returns the first response to the client to satisfy the database request and no second query is sent. Otherwise, the server sends the second query to the distributed database and returns the second response to the client.

Advantageously, example embodiments of the improved technique relieve client machines and their programmers from the burden of having to decide between good performance and stale data, as well as from the burden of coping with stale data when it arrives. Rather, the improved technique provides a generalized solution based on a client-supplied plausibility condition. The plausibility condition can take any suitable form and provides a standard for assessing whether a response to a lower-consistency query is sufficient for the client's purposes or whether a higher consistency response is desired.

Certain embodiments are directed to a method of managing client access to a distributed database implemented with multiple coordinating nodes on a network. The method includes receiving, by a server and over the network, a database request from a client machine, the database request including (i) a query description and (ii) a plausibility condition. In response to receiving the database request, the method includes submitting a first query to the distributed database. The first query is based on the query description and specifies a first consistency level. The first consistency level is indicative of a first number of nodes of the distributed database to be accessed in performing the first query. The method further includes receiving, in response to the first query, a first query response from the distributed database and performing a testing operation on the first query response. The testing operation is arranged to generate a first output when the first query response meets the plausibility condition and to generate a second output when the first query response does not meet the plausibility condition. In response to the testing operation generating the second output, the method further includes (i) submitting a second query to the distributed database, the second query based on the query description and specifying a second consistency level, the second consistency level indicative of a second number of nodes, greater than the first number of nodes, of the distributed database to be accessed in performing the second query, (ii) receiving, in response to the second query, a second query response from the distributed database, and (iii) returning the second query response to the client machine.

Other embodiments are directed to a server computer constructed and arranged to perform a method of managing client access to a distributed database implemented with multiple coordinating nodes on a network, such as the method described above. Still other embodiments are directed to a computer program product. The computer program product stores instructions which, when executed by control circuitry, cause the control circuitry to perform a method of managing client access to a distributed database implemented with multiple coordinating nodes on a network, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing access to a distributed database includes providing a server configured to receive database requests from client machines over a network. The improved technique relieves client machines from having to choose between good performance and stale data and relieves client machines and their programmers from the burden of coping with stale data.

Figure 1:
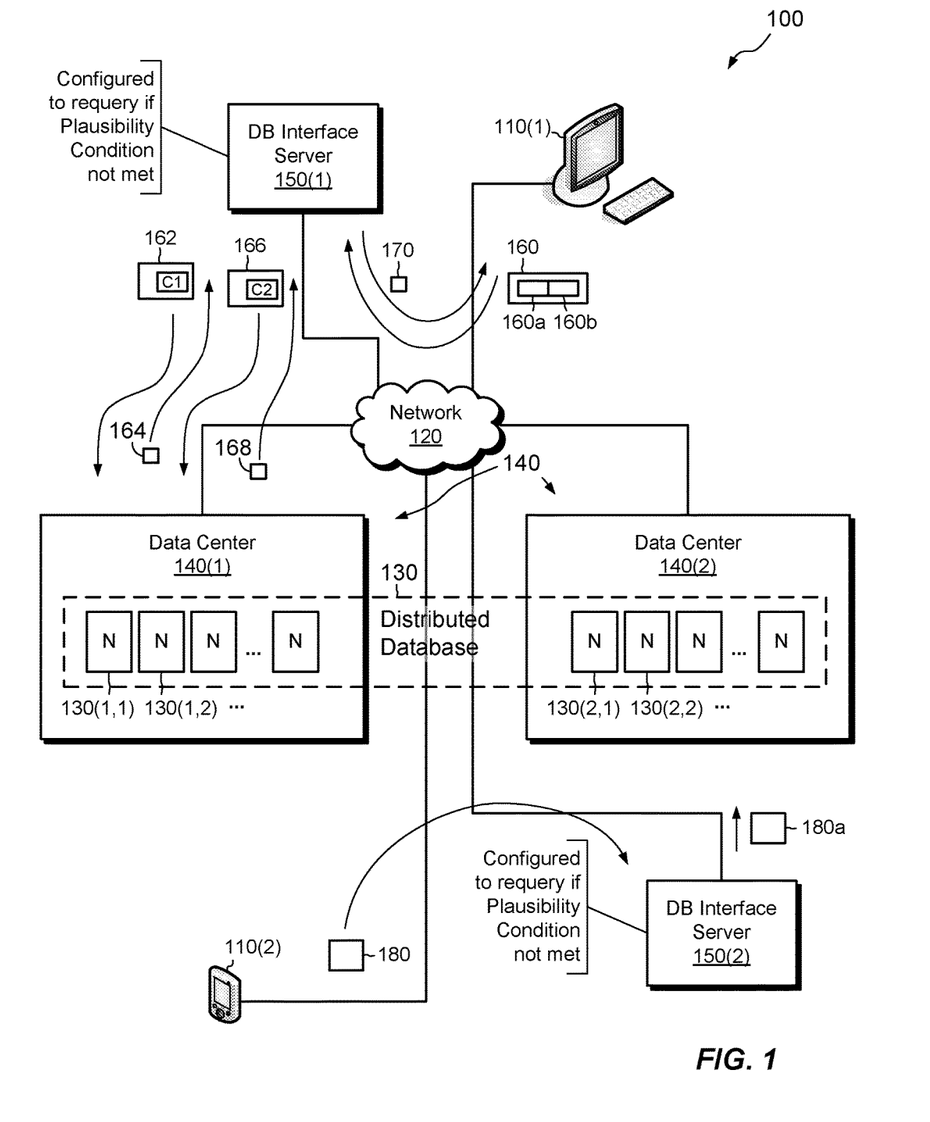
FIG. 1 is a block diagram of an example environment in which embodiments of the improved technique hereof can be practiced.

FIG. 1 shows an example environment 100 in which embodiments of the improved technique hereof can be practiced. Here, client machines 110(1) and 110(2) are connected to a network 120 for accessing a distributed database 130 via database interface servers 150(1) and 150(2). The distributed database 130 is hosted from data centers 140(1) and 140(2), with a first set of nodes (130(1,1), 130(1,2), . . . ) of the database 130 operated within data center 140(1) and a second set of nodes (130(2,1), 130(2,2), . . . ) operated within data center 140(2). In an example, the distributed database 130 is an eventually-consistent, AP database. Non-limiting examples of such databases include Apache Cassandra (open source), Voldemort (open source), and Amazon DynamoDB, for example.

The environment 100 may include any number of client machines 110, database interface servers 150, and data centers 140, including a single one of each. In some examples, no data center is required. Rather, nodes (N) of the distributed database 130 may instead be provided on one or more computers or other computing devices connected to the network 120 and capable of running distributed database software. In some examples, the data centers 140 are provided in different geographical locations. For large-scale, Internet applications, data centers 140 hosting nodes of the distributed database 130 may be deployed worldwide. In some examples, the database interface servers 150 may similarly be provided in large numbers and in different geographical locations, to promote efficient access from client machines in the respective locations. The database interface servers 150 may each be implemented using dedicated server computers, using virtual machines, and/or using any other computing technology. Different database interface servers 150 may be implemented differently. In some examples, database interface servers 150 are located within respective data centers 140; however, this is not required. Nor is there any requirement that the number of database interface servers 150 be the same as the number of data centers 140.

The client machines 110 may be realized as any type or types of computing device or devices capable of executing software and communicating over the network 120. For instance, each client machine 110 may be provided as a desktop computer, laptop computer, smartphone, tablet, personal data assistant, set top box, or gaming console, for examples. The network 120 can be realized with any suitable network or networks capable of conveying data, such as a LAN (Local Area Network), WAN (Wide Area Network), the Internet, a telephone network, cell phone network, data network, or any combination of the foregoing, for example.

Each database interface server 150 acts as an intermediary between one or more client machines 110 and the distributed database 130. For example, each database interface server 150 receives database requests from client machines, processes the requests, and sends commands corresponding to the requests to the distributed database 130. For database requests that entail responses, the database interface server 150 receives the responses from the distributed database 130 and returns the responses to the requesting client machines 110. In an example, each database interface server 150 acts as an intermediary for all conventional CRUD (Create/Read/Update/Delete) operations.

For database requests that specify reads from the distributed database 130, each database interface server 150 performs intelligent processing to ensure that the requesting client machines receive responses that are sufficiently consistent in the context of the particular requests. As will be described, this intelligent processing involves initially querying the distributed database 130 with a lower-consistency level and checking whether a query response received from the distributed database 130 meets a client-supplied plausibility condition. If the response meets the condition, the database interface server 150 returns the response to the requesting client machine 110. Otherwise, the database interface server 150 resubmits the same query to the distributed database 130, but this time specifying a higher level of consistency. The database interface server 150 receives a response to the resubmitted query and returns the response to the requesting client machine 110. In this manner, the database interface server 150 performs efficient, lower-consistency queries first, with such queries often returning consistent-enough responses to satisfy plausibility conditions. The database interface server 150 is therefore able to operate the distributed database 130 at high efficiency much of the time. But in cases where greater consistency is needed, as indicated when plausibility conditions fail to be met, the database interface server 150 obtains more consistent responses, albeit with lower efficiency. In this manner, the database interface server 150 makes profitable and effective use of the distributed database 130, benefiting from its high efficiency when appropriate, but obtaining more consistent results when needed.

The database interface servers 150 perform their intelligent processing on behalf of client machines 110 and thereby relieve the client machines from the burdens of performing this processing themselves. Further, the database interface servers 150 translate between a generic interface protocol exposed to client machines 110 and a database-specific interface protocol particular to the distributed database used.

The generic interface protocol may be the same regardless of the particular type of distributed database 130. Programmers of client software can thus effect database operations without having to master the particular idiosyncrasies of the distributed database 130. Rather, once a programmer learns the generic interface of the database interface server 150, the programmer can generally accomplish necessary tasks with little or no database-specific knowledge. The generic interface protocol may be any implemented in any suitable way and with any suitable technology, such as using REST (Representational State Transfer), JSON (JavaScript Object Notation), SOAP (Simple Object Access Protocol), and so forth. In a particular example, the generic interface protocol is implemented as REST over HTTP (Hypertext Transfer Protocol). The database-specific interface protocol is specific to the particular distributed database 130. For instance, if the distributed database 130 is implemented with Apache Cassandra, then the database-specific interface protocol may be CQL (Cassandra Query Language).

In example operation, the client machine 110(1) submits a database request 160 to database interface server 150(1). For example, the client machine 110(1) submits an HTTP GET request specifying a particular REST URI (Uniform Resource Identifier). The database request 160 includes a query description 160a and a plausibility condition 160b. The query description 160a specifies data to be read from the distributed database 130 and may include, for example, one or more field names, filter criteria, relationships, and the like. The plausibility condition 160b is a condition that a response to a lower-consistency query must meet to avoid the need to submit a higher-consistency query. In an example, the plausibility condition it based on a priori information in possession of the client machine 110(1) concerning data elements to be read, such as whether they exist or not, when they were last updated, and so on.

The database interface server 150(1) receives the database request 160 over the network 120 and processes the database request 160. Processing the database request 160 includes constructing a first query 162 based on the query description 160a and sending the first query 162 over the network 120 to the distributed database 130. The database interface server 150(1) constructs the first query 162 in accordance with the database-specific protocol. The first query 162 specifies a first consistency level, C1, which indicates a number of nodes of the distributed database 130 to be accessed in processing the first query. The number of nodes specified by C1 is generally a single node or a small number of nodes, and may be expressed as an integer value, as a percentage of total nodes (e.g., less than 10%), or in any other suitable way. The distributed database 130 receives the first query 162, accesses the number of nodes indicated, and coordinates responses from the accessed nodes to produce a first query response 164. In an example, the first query response 164 includes the most recent version of data obtained from the accessed nodes.

The database interface server 150(1) receives the first query response 164 according to the database-specific protocol and proceeds to test the first query response 164 against the plausibility condition 160b. To provide an illustrative example, the plausibility condition 160b may require simply that the first query response 164 contain a non-empty value. This condition may be based on a priori information available to the client machine 110(1) that the distributed database 130 has previously received a non-empty value for the data being queried. If the plausibility condition 160b is satisfied, e.g., if the first query response 164 contains non-empty data, then the first query response 164 is sufficient. The database interface server 150(1) returns a response 170 to the client machine 110(1) to satisfy the database request 160. The response 170 includes the data provided in the first query response 164 and may be provided in the form of a response to the same HTTP GET request that conveyed the database request 160.

If the plausibility condition 160b is not met, however, e.g., if the first query response 164 contains or otherwise indicates empty data, then the database interface server 150(1) constructs a second query 166. The second query 166 is also based on the query description 160a and is provided in the database-specific protocol. However, the second query 166 specifies a second consistency level, C2, which indicates a greater number of nodes of the distributed database 130 than did the first consistency level, C1. In an example, the second consistency level, C2, indicates half or more of the nodes of the distributed database 130. As with C1, the number of nodes specified by C2 may also be expressed as an integer value, as a percentage of total nodes in the distributed database 130, or in any other suitable way. The distributed database 130 receives the second query 166, accesses the number of nodes indicated by C2, runs the query on those nodes, and coordinates responses from the accessed nodes to produce a second query response 168. In an example, the second query response 168 includes the most recent version of data obtained from the greater number of accessed nodes. The distributed database 130 returns the second query response 168 to the database interface server 150(1). The database interface server 150(1) returns the second query response 168 to the client machine 110(1), i.e., in the response 170. The response 170 may be provided in the form of a response to the same HTTP GET request that conveyed the database request 160.

In this manner, the database interface server 150(1) performs only a lower-consistency query, if doing so produces a query response sufficient to satisfy the plausibility condition 160b. Otherwise, the database interface server 150(1) performs both a lower-consistency query and a higher-consistency query.

Although only two queries have been described, it should be understood that the database interface server 150(1) may perform one or more additional queries. For instance, the database interface server 150(1) may further operate to test the second query response 168 to determine whether it meets the plausibility condition 160b. If it does not, the database interface server 150(1) may construct and submit yet another query based on the received query description 160a, but this time specifying an even higher level of consistency, such as all nodes, or nearly all nodes, of the distributed database 130.

In some examples, the environment 100 further supports data updates (writes) to the distributed database 130. For example, client machine 110(2) may submit an update request 180 over the network 120 to database interface server 150(2). The client machine 110(2) may provide the update request 180 in accordance with the generic interface protocol, e.g., as a REST command within an HTTP POST instruction. In response to receiving update request 180, the database interface server 150(2) translates the update request 180 into a corresponding update query 180a according to the database-specific protocol and submits the update query 180a to the distributed database 130. The distributed database 130 receives the update query 180a (e.g., at one or more nodes thereof), updates the specified data, and propagates the specified data to other nodes of the distributed database 130. The database interface servers 150 may handle requests from client machines 110 to perform create and delete instructions in a similar ways, i.e., by translating REST commands received over HTTP into respective commands according to the database-specific protocol and submitting the commands to the distributed database 130. Although this example describes operation when it is the client machine 110(2) that submits the update request 180, it should be understood that any client machine 110 may do so, including the client machine 110(1).

As an optional optimization, each database interface server 150, or any subset of them, may be configured with a list of one or more write priority nodes of the distributed database 130. In an example, the write priority nodes for a particular database interface server 150 are nodes in close network proximity to the respective database interface server 150, e.g., as measured by a number of network hops and/or round-trip time. It should be understood, however, that other criteria may be used in assigning priority nodes besides network proximity, such as available workload, network bandwidth, and so forth. When receiving requests 180 that specify data updates to be written, the database interface servers 150 may preferentially direct such updates to their respective write priority nodes. If, soon after writing, a database interface server 150 is called upon to obtain newly written data, that database interface server 150 may direct a query to the same write priority node(s), thus reflecting the expectation that the data will be available from the same node(s) to which they were written. Using this approach, lower-consistency queries are more likely to return current results than they would if nodes were chosen randomly. Plausibility conditions are thus more likely to be met and the need for higher-consistency queries is more likely to be avoided.

In some examples, the database interface servers 150 may also be configured with a list of read priority nodes. For instance, the distributed database 130 may be configured to receive data updates at the write priority nodes and quickly to propagate the new data to the read priority nodes. Each database interface server 150, or some subset of them, may then be configured preferentially to direct database requests 160 to the read priority nodes. The use of read priority nodes may also improve the likelihood that lower-consistency queries will return responses that meet plausibility conditions. Providing read priority nodes separately from write priority nodes provides the additional benefit of reducing network traffic and processing load on the write priority nodes. In some examples, write priority nodes and read priority nodes are segregated in different data centers 140. For example, the nodes 130(1,1), 130(1,2), . . . in data center 140(1) may be designated as write priority nodes, and the nodes 130(2,1), 130(2,2), . . . in data center 140(2) may be designated as read priority nodes. This is merely an example, however, as write priority nodes and read priority nodes may be provided in any suitable location or locations.

In some examples, client machines 110 access the database interface servers 150 by directing requests 160 and 180 to a common site (not shown), such as a website having a specified URL. Instructions executing at the website route requests 160 and 180 to database interface servers 150, based on, for example, network proximity between client machines 110 and database interface servers 150.

Figure 2:
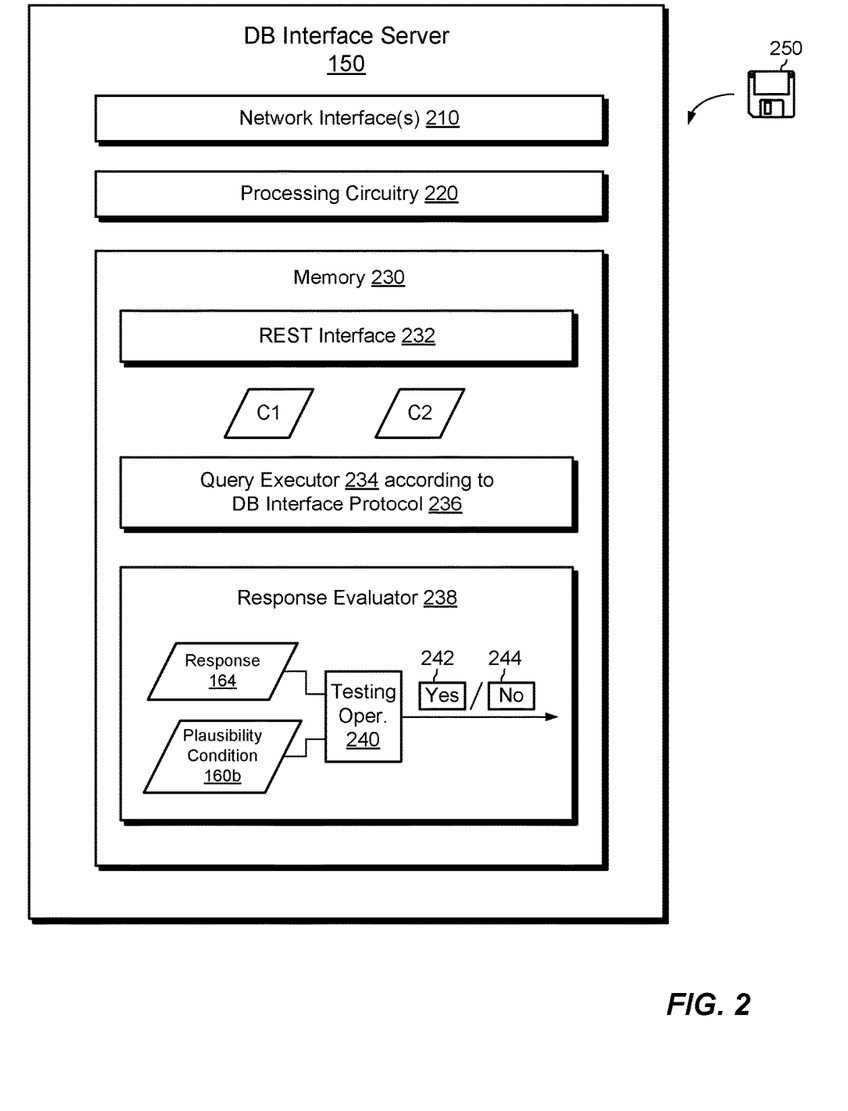
FIG. 2 is a block diagram of an example server computer, which implements a database interface server as shown in FIG. 1.

FIG. 2 shows an example database interface server 150 in greater detail. The database interface server 150 of FIG. 2 is intended to be representative of database interface servers 150(1) and 150(2) of FIG. 1. However, it should be understood that different database interface servers 150 need not be identical.

The database interface server 150 is seen to include a set of network interfaces 210 (e.g., one or more Ethernet adapters, WiFi adapters, etc.), processing circuitry 220 (e.g., one or more processing chips and/or assemblies), and memory 230. The memory 230 includes both volatile memory (e.g., RAM) and non-volatile memory, such as one or more disk drives, solid state drives, and the like. The processing circuitry 220 and the memory 230 are constructed and arranged to carry out various methods and functions as described herein. Also, the memory 230 includes a variety of software constructs realized in the form of executable instructions. When the executable instructions are run by the processing circuitry 220, the processing circuitry 220 is caused to carry out the operations of the software constructs. Although certain software constructs are specifically shown and described, it is understood that the memory 230 typically includes many other software constructs, which are not shown, such as an operating system, various applications, processes, and daemons.

Executable instructions in the memory 230 are seen to realize a REST interface 232, a query executor 234, and a response evaluator 238. In an example, the REST interface 232 includes multiple regions of executable instructions at respective URI's to support each of the conventional CRUD operations.

The query executor 234 is constructed and arranged to construct queries, such as queries 162 and 166, based on query descriptions 160*a* and in accordance with a particular database-specific interface protocol 236. The query executor 234 is also constructed and arranged to submit queries constructed as above to the distributed database 130. Such queries may request the lower-consistency level, C1, or the higher consistency level, C2. In some examples, additional consistency levels may be requested. The query executor 234 also receives query responses, e.g., 164 and 168.

The response evaluator 238 performs a testing operation 240. The testing operation 240 is arranged to test whether a query response (e.g., the first query response 164) in response to a database request 160 meets the plausibility condition 160*b* provided with that request 160. The testing operation 240 is arranged to generate a first output 242 (Yes) when the query response meets the plausibility condition 160*b* and to generate a second output 244 (No) when the query response does not meet the plausibility condition 160*b*. If the testing operation 240 generates the first output 242, then the response evaluator 238 directs the REST interface 232 to return the first query response 164, e.g., as a response to a pending HTTP GET request. Otherwise, the response evaluator 238 directs the query executor 234 to requery the distributed database 130 at the higher-consistency level, C2. The REST interface 232 then returns a subsequently arriving second query response 168, e.g., as a response to the pending HTTP GET request.

Figure 3:
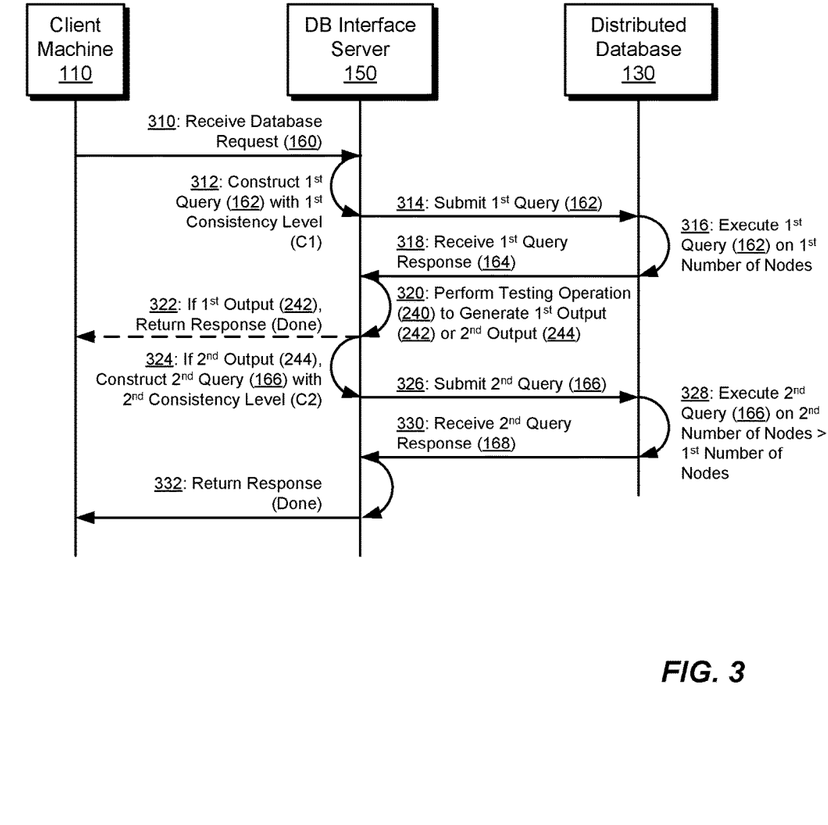
FIG. 3 is a sequence diagram showing an example sequence of events that may be conducted when practicing embodiments of the improved technique hereof.

FIG. 3 shows an example sequence of activities performed in the environment of FIG. 1 when a client machine 110 submits a database request 160 for reading data from the distributed database 130.

At 310, the database interface server 150 receives the database request 160. The request 160 includes a query description 160*a* and a plausibility condition 160*b*. In an example, the database request 160 is received over the network 120 as a REST instruction provided within an HTTP request.

At 312, the database interface server 150 constructs a first query 162. The first query 162 implements the query description 160a in the database-specific interface protocol 236 of the distributed database 130 and specifies a first consistency level, C1. The first consistency level indicates a first number of nodes (e.g., a single node or a small number of nodes; e.g., less than 10%) of the distributed database 130 to be accessed when running the first query 162. The first number of nodes may be expressed as an integer, as a percentage, or in any other suitable way.

At 314, the database interface server 150 submits the first query 162 to the distributed database 130. For example, the database interface server 150 directs the first query 162 to a single node of the distributed database 130. This may be the case even if the first consistency level, C1, indicates greater than one node.

At 316, the distributed database 130 executes the first query 162. For example, the node to which the first query 162 was directed may execute the query 162. If the first number of nodes indicates a number greater than one, the node receiving the first query 162 directs the first query 162 to one or more other nodes of the distributed database 130, with the total number of nodes receiving the first query 162 equal to the first number of nodes. Each node receiving the first query 162 executes the first query 162, and the nodes cooperate to generate the first query response 164, which may reflect the most recent data obtained across all of the queried nodes.

At 318, the database interface server 150 receives the first query response 164 from the distributed database 130, e.g., from the particular node to which the first query 162 was sent. The first query response 164 arrives in the database-specific interface protocol.

At 320, the database interface server 150 performs the testing operation 240 on the first query response 164 to generate either the first output 242 (Yes) or the second output 244 (No), based on whether the first query response 164 satisfies the plausibility condition 160b. If the testing operation 240 generates the first output 242 (Yes), then the database interface server 150 simply returns the data provided in the first query response 164 to the client machine 110, e.g., as a response to the HTTP GET request (at 322). Otherwise, operation continues to 324.

At 324, the database interface server 150 constructs the second query 166. In an example, the second query 166 is identical to the first query 162, except that it specifies the second consistency level, C2.

At 326, the database interface server 150 submits the second query 166 to the distributed database 130, e.g., in a similar way to that described at 314. Here, however, second query 166 specifies a second number of nodes, greater than the first number of nodes, such as half or more of the nodes in the distributed database 130.

At 328, the distributed database 130 executes the second query 166, e.g., by executing the second query 166 on each of the second number of nodes specified. The distributed database 130 coordinates responses from the newly queried nodes to arrive at a single query response 168, e.g., which may reflect the most recent data obtained across all of the newly queried nodes.

At 330, the database interface server 150 receives the second query response 168 from the distributed database 130. The second query response 168 is received in accordance with the database-specific interface protocol 236.

At 332, the database interface server 150 returns the second query response 168 to the client machine 110, e.g., as a response to the HTTP GET request.

The above-described sequence is intended to illustrate example embodiments of the invention and is not intended to be limiting. For instance, according to one variant, when submitting the second query 166 at 326, the database interface server 150 directs multiple second queries to different groups of nodes of the distributed database 130, contemporaneously and effectively in parallel. Each second query designates multiple nodes, and the database interface server 150 receives a response (like response 168) from each group of nodes as the respective queries are completed. In an example, the database interface server 150 checks the query response from each group of nodes as it arrives, and returns, to the client machine 110, the query response (like the query response 168) that first meets the plausibility condition 160b.

Figure 4A:
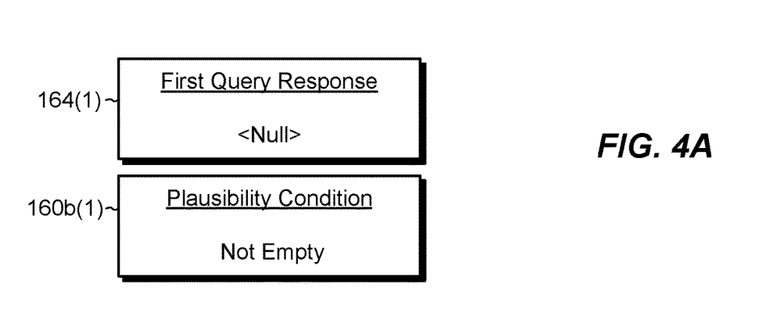
FIGS. 4A, 4B, and 4C are block diagrams showing example plausibility conditions and respective query responses to which the plausibility conditions are applied.
Figure 4B:
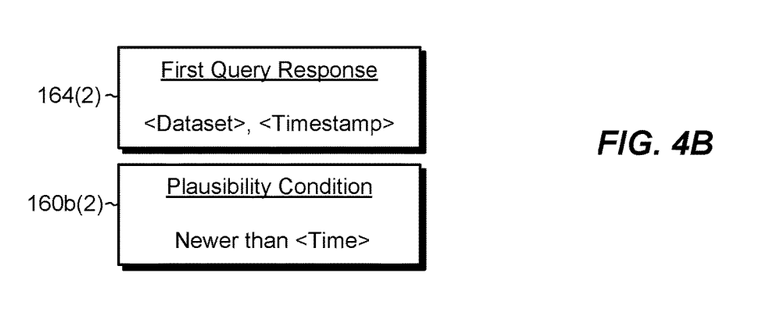
Figure 4C:
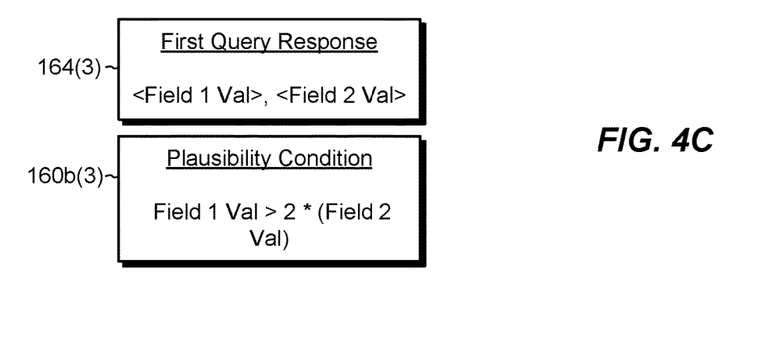

FIGS. 4A-4C show different examples of plausibility conditions 160b and associated first query responses 164 and provides examples of how testing operation 240 may be conducted.

In FIG. 4A, a plausibility condition 160b(1) requires that the first query response 164(1) be "Not Empty," meaning that the first query response 164(1) must include data. A client machine 110 may specify this plausibility condition 160b(1), for example, if the client machine 110 has a priori information that the queried data has previously been written to the distributed database 130. Here, the first query response 164(1) is <Null>, however. This Null response indicates that the particular node or nodes accessed in the distributed database 130 when executing the first query 162 did not include the expected data. Under these conditions, the testing operation 240 generates the second response 244, indicating that, "No," the plausibility condition 160b(1) has not been met and that a higher-consistency query should be performed.

In FIG. 4B, the plausibility condition 160b(2) requires that the first query response 164(2) be "Newer than <Time>," where <Time> specifies a particular date and/or time. Thus, the plausibility condition 160b(2) requires that the data returned in the first query response 164b(2) has been updated at least as recently as <Time>. A client machine 110 may specify this plausibility condition 160b(2), for example, if the client machine 110 has a priori information that the queried data was previously updated in the distributed database 130 at the specified <Time>. Here, the first query response 164(2) specifies a <Dataset> providing the requested data and a <Timestamp>. To perform the testing operation 240, the database interface server 150 compares the <Timestamp> in the first query response 164(2) with the specified <Time> in the plausibility condition 164(2). If the <timestamp> is equal to or more recent than the <Time>, the testing operation 240 generates the first output 242 (Yes), such that no higher-consistency query is required. Otherwise, the testing operation 240 generates the second output (No) and a higher-consistency query is performed.

In FIG. 4C, the plausibility condition 160b(3) requires that the first query response 164(3) satisfy a particular expression. Any expression can be used; the one shown is merely illustrative. Here, the plausibility condition 160b(3) requires that a value returned in a first database field (Field 1) be greater than twice the value returned in a second database field (Field 2). The first query response 164(3) provides values of Field 1 and Field 2 (i.e., <Field 1 Val> and <Field 2 Val>) acquired as a result of a first query 162. In this example, a client machine 110 may specify the plausibility condition 160b(3), for example, if the client machine 110 has a priori information that the fields of the distributed database 130 should reflect the indicated arrangement. If the returned field values meet the plausibility condition 160b(3), the testing operation 240 generates the first output 242 (Yes), such that no higher-consistency query is required. Otherwise, the testing operation 240 generates the second output (No) and a higher-consistency query is performed.

It should be understood that plausibility conditions may be defined based on any pattern, comparison, or mathematical expression, and that the examples shown are merely illustrative. Further, it should be understood that the scope of the plausibility conditions may include "True," meaning that the condition is automatically met, such that no higher-consistency query is needed, as well as "False," meaning that a higher-consistency query must be performed. In instances where the plausibility condition is "False," the database interface server 150 may skip the low-consistency query and jump straight to the high-consistency query.

Figure 5:
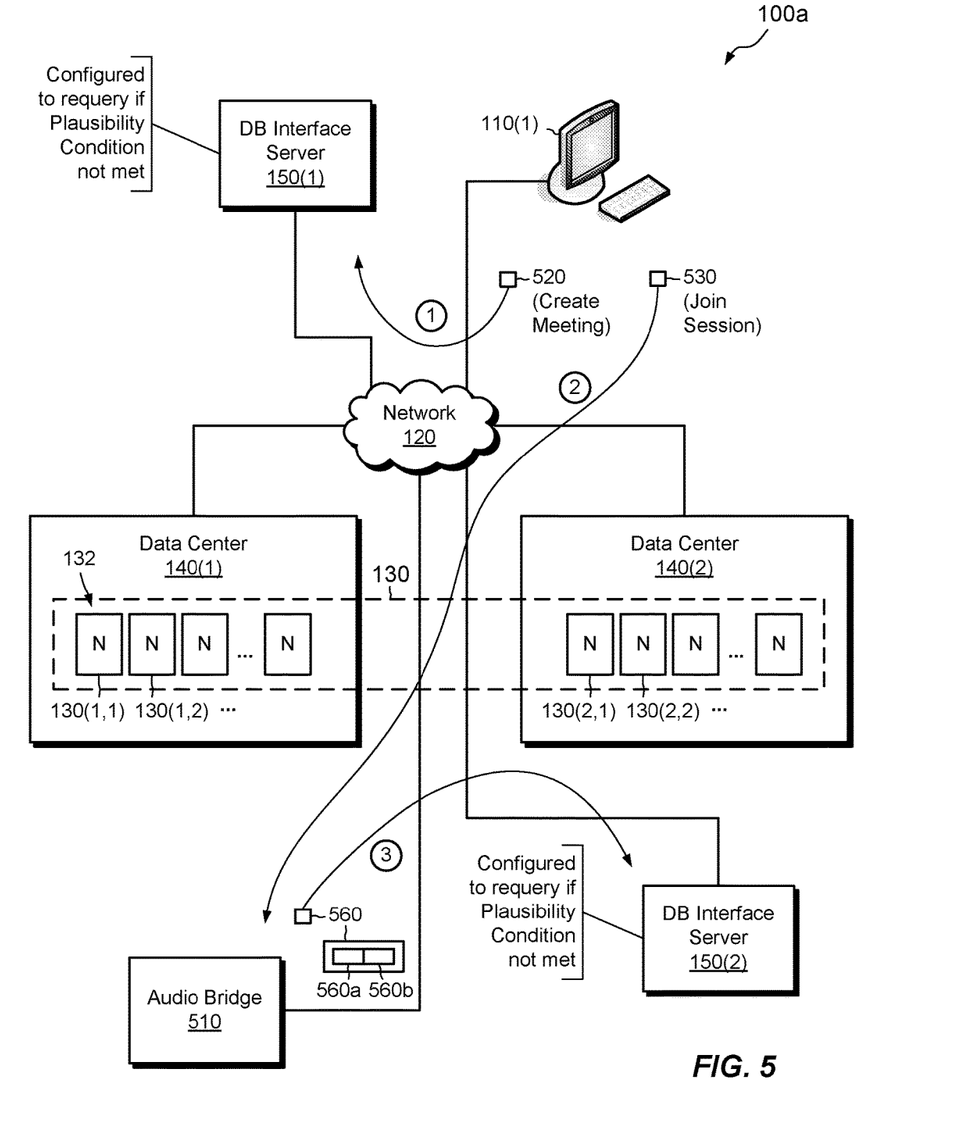
FIG. 5 is a block diagram showing an example modified environment in which embodiments of the improved technique hereof can be practiced in the context of web conferencing, web seminars, and web training.

FIG. 5 shows another example environment 100a in which embodiments of the improved technique hereof may be practiced. Here, the environment 100a is similar to the environment 100, except that elements shown in the figure have been arranged for web conferencing, web seminars, and/or web training events. Here, the client machine 110(2) has been replaced with an audio bridge 510. The audio bridge 510 is a type of client machine 110 that also serves to blend voice input from telephone lines and/or computerized devices (e.g., arriving via Voice Over Internet Protocol—VOIP), as well as to distribute blended voice input to various participants. Audio bridges, like the audio bridge 510, are commonly found in web conferencing, web seminar, and/or web training systems.

In this example, a user of client machine 110(1) wishes to create a new web conference, seminar, or training event. For example, the user operates instructions on the client machine 110(1) to create a new "meeting," a term that we use generically to refer to conferences, seminars, training events, and the like. The instructions operate to generate an update request 520 to create the new meeting. The update request 520 is of the same type as the update request 180 described in connection with FIG. 1 and specifies details about the meeting to be created. As indicated with the encircled numeral (1), the client machine 110(1) sends the update query 520 over the network 120 to the database interface server 150(1). The database interface server 150(1) then submits an update query according to the database-specific protocol to one or more nodes of the distributed database 130. Such one or more nodes receive the new data and act to propagate the new data, over time, to other nodes of the distributed database 130.

Shortly after creating the new meeting, at (2), the client machine 110 sends a message 530 to the audio bridge 510 to join the meeting. When the audio bridge 510 receives the message 530, the audio bridge 510 generates a database request 560 to lookup meeting-specific information about the new meeting in the distributed database 130. The database request 560 is of the same type as the database request 160 (FIG. 1) and includes a query description 560a and a plausibility condition 560b. The plausibility condition 560b requires merely that the read query 560 return non-empty data, in a manner similar to the example shown in FIG. 4A, to reflect the fact that the audio bridge 510 has a priori information (from the message 530) that a meeting has been created and that the distributed database 130 stores meeting-specific information.

At (3), the audio bridge 510 sends the database request 560 to the database interface server 150(2). In response, the database interface server 150(2) submits a first query (162) at a low-consistency level (e.g., at C1; see FIG. 1) and tests a query response (164) to determine whether the response (164) meets the plausibility condition 560a. Given the close timing involved, as well as the fact that the database interface server 150(2) may be geographically remote from the database interface server 150(1), a possibility exists that the update submitted in the update query 520 has not yet propagated to the node, or group of nodes, to which the database request 560 is directed. Thus, the query response (164) may return an empty response, causing the testing operation 240 (FIG. 2) to generate the second output 244 (No). Consequently, the database interface server 150(2) submits a second query (166) specifying the same query description 560a but with a higher-consistency level (e.g., C2). The second query (166) specifies a greater number of nodes, which may include nodes now storing the updated data specified in update request 520. The database interface server 150(2) receives a second query response (168) and returns the response (168) to the audio bridge 510. The audio bridge 510 then receives the meeting-specific information and is able to begin the meeting.

An improved technique has been disclosed for managing access to a distributed database 130. The technique includes providing a database interface server 150 configured to receive database requests 160 from client machines 110 over a network 120. The server 150 intelligently responds to a database request 160 by (i) sending a first query 162 to the distributed database 130 at a lower consistency level, C1, to obtain a first response 164 and (ii) conditionally sending a second query 166 to the distributed database 130 at a higher consistency level, C2, to obtain a second response 168. The server 150 sends the second query 166 conditionally based on whether the first response 164 meets a plausibility condition 160b specified in the database request 160. If the first response 164 meets the plausibility condition 160b, the server 150 returns the first response 164 to the client 110 to satisfy the database request 160 and no second query 166 is sent. Otherwise, the server 150 sends the second query 166 to the distributed database 130 and returns the second response 168 to the client 110.

Having described certain embodiments, numerous alternative embodiments or variations can be made. For example, as an alternative to providing a separate database interface server 150 (or multiple such database interface servers 150), each client machine 110 may be equipped with an SDK (Software Development Kit) for deploying functionality similar to that attributed above to the database interface servers 150. Thus, for example, client machines 110, rather than the database interface servers 150, may be configured to generate and submit first queries 162, to test query responses 164 against plausibility conditions 160b, and, if necessary, to generate and submit second queries 166 and to receive query responses 168.

Also, embodiments have been described in connection with an eventually-consistent, AP database. It is known that such databases are typically of the "NoSQL" variety. However, the above-described techniques could also be used with conventional databases supporting SQL (Structured Query Language), including relational databases deployed over multiple nodes.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 250 in FIG. 2). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing client access to a distributed database implemented with multiple coordinating nodes on a network, the method comprising:
   receiving, by a server and over the network, a database request from a client machine, the database request including (i) a query description and (ii) a plausibility condition, the plausibility condition based on a priori information;
   in response to receiving the database request, submitting a first query to the distributed database, the first query based on the query description and specifying a first consistency level, the first consistency level indicative of a first number of nodes of the distributed database to be accessed in performing the first query;
   receiving, in response to the first query, a first query response from the distributed database;
   performing, by the server, a testing operation on the first query response, the testing operation arranged to generate a first output when the first query response meets the plausibility condition and to generate a second output when the first query response does not meet the plausibility condition; and
   in response to the testing operation generating the second output,
   (i) submitting a second query to the distributed database, the second query based on the query description and specifying a second consistency level, the second consistency level indicative of a second number of nodes, greater than the first number of nodes, of the distributed database to be accessed in performing the second query,
   (ii) receiving, in response to the second query, a second query response from the distributed database, and
   (iii) returning the second query response to the client machine.

2. The method of claim 1, wherein the method frees the client machine from having to perform multiple queries of the distributed database when the plausibility condition is not initially met.

3. The method of claim 2, further comprising implementing the server with a particular computing machine, distinct from the client machine and from the distributed database, the particular computing machine constructed and arranged to receive database requests, submit queries to the distributed database, receive query responses from the distributed database, and test whether at least some query responses meet plausibility conditions.

4. The method of claim 1, wherein the distributed database is an eventually-consistent database in which data updates propagate among multiple participating nodes over time, such that the participating nodes are temporarily inconsistent with one another with respect to at least one data element stored in the distributed database.

5. The method of claim 4,
   wherein receiving the database request from the client machine is performed in accordance with a first interface protocol,
   wherein submitting the first query and submitting the second query are performed in accordance with a second interface protocol, the second interface protocol supported by the distributed database and being different from the first interface protocol, and
   wherein receiving the first query response and receiving the second query response are performed in accordance with the second interface protocol.

6. The method of claim 5, wherein the first interface protocol is a REST (Representational State Transfer) protocol, wherein, when receiving the database request, the query description and the plausibility condition arrive in a REST instruction conveyed in an HTTP (Hypertext Transfer Protocol) request, and wherein the method further comprises, by the server:
   constructing the first query as a first query language instruction in accordance with the second interface protocol, the first query language instruction implementing the query description and specifying the first consistency level;
   constructing the second query as a second query language instruction in accordance with the second interface protocol, the second query language instruction implementing the query description and specifying the second consistency level; and
   returning the second query response to the client machine in a response to the HTTP request.

7. The method of claim 5, wherein, when submitting the second query, the method further comprises submitting a set of additional queries contemporaneously with submitting the second query, each of the set of additional queries being based on the query description and directed to a respective set of nodes of the distributed database.

8. The method of claim 5, further comprising:
receiving, by the server, an update request from the client machine in accordance with the first interface protocol, the update request specifying a set of data to be written to the distributed database;
translating, by the server, the update request into an update query in accordance with the second interface protocol; and
submitting the update query to the distributed database.

9. The method of claim 8, further comprising:
maintaining, by the server, a list of priority nodes of the distributed database, the list of priority nodes being a subset of all nodes of the distributed database, wherein, when submitting the update query to the distributed database, the server directs the update query to one of the priority nodes.

10. The method of claim 9, wherein receiving the update request from the client machine is performed prior to receiving the database request from the client machine, and wherein submitting the first query includes directing the first query to the one of the priority nodes.

11. The method of claim 8, wherein the plausibility condition is met when the first query response returns a non-empty value.

12. The method of claim 8, wherein the plausibility condition specifies a time, and wherein the plausibility condition is met when the first query response returns a value having a timestamp more recent than the specified time.

13. The method of claim 8, wherein the plausibility condition specifies a predetermined pattern of database field values, and wherein the plausibility condition is met when the first query response returns a value that matches the predetermined pattern.

14. A server computer comprising a network interface configured to access a distributed database over a network, control circuitry including a set of processing units coupled to the network interface and to memory, the control circuitry constructed and arranged to:
receive, over the network, a database request from a client machine, the database request including (i) a query description and (ii) a plausibility condition, the plausibility condition based on a priori information;
in response to receiving the database request, submit a first query to the distributed database, the first query based on the query description and specifying a first consistency level, the first consistency level indicative of a first number of nodes of the distributed database to be accessed in performing the first query;
receive, in response to the first query, a first query response from the distributed database;
perform a testing operation on the first query response, the testing operation arranged to generate a first output when the first query response meets the plausibility condition and to generate a second output when the first query response does not meet the plausibility condition; and
in response to the testing operation generating the second output,
(i) submit a second query to the distributed database, the second query based on the query description and specifying a second consistency level, the second consistency level indicative of a second number of nodes, greater than the first number of nodes, of the distributed database to be accessed in performing the second query,
(ii) receive, in response to the second query, a second query response from the distributed database, and
(iii) return the second query response to the client machine.

15. The server computer of claim 14, wherein the control circuitry is further constructed and arranged to:
receive, over the network, a second database request from a second client machine, the second database request including (i) a second query description and (ii) a second plausibility condition;
in response to receiving the second database request, submit a third query to the distributed database, the third query based on the second query description and specifying the first consistency level;
receive, in response to the third query, a third query response from the distributed database;
perform a second testing operation on the third query response, the second testing operation arranged to generate the first output when the third query response meets the second plausibility condition and to generate the second output when the third query response does not meet the second plausibility condition; and
in response to the second testing operation generating the first output, return the third query response to the second client machine.

16. A computer-program product including a set of non-transitory, computer-readable media having instructions which, when executed by control circuitry of a server computer, cause the control circuitry to perform a method for managing client access to a distributed database implemented with multiple coordinating database nodes on a network, the method comprising:
receiving a database request from a client machine, the database request including (i) a query description and (ii) a plausibility condition, the plausibility condition based on a priori information;
in response to receiving the database request, submitting a first query to the distributed database, the first query based on the query description and specifying a first consistency level, the first consistency level indicative of a first number of nodes of the distributed database to be accessed in performing the first query;
receiving, in response to the first query, a first query response from the distributed database;
performing a testing operation on the first query response, the testing operation arranged to generate a first output when the first query response meets the plausibility condition and to generate a second output when the first query response does not meet the plausibility condition; and
in response to the testing operation generating the second output,
(i) submitting a second query to the distributed database, the second query based on the query description and specifying a second consistency level, the second consistency level indicative of a second number of nodes, greater than the first number of nodes, of the distributed database to be accessed in performing the second query,
(ii) receiving, in response to the second query, a second query response from the distributed database, and
(iii) returning the second query response to the client machine.

17. The computer program product of claim 16,
wherein receiving the database request from the client machine is performed in accordance with a first interface protocol, wherein submitting the first query and submitting the second query are performed in accordance with a second interface protocol, the second interface protocol supported by the distributed database and being different from the first interface protocol, and wherein receiving the first query response and receiving the second query response are performed in accordance with the second interface protocol.

18. The computer program product of claim 17, wherein the first interface protocol is a REST (Representational State Transfer) protocol, wherein, when receiving the database request, the query description and the plausibility condition arrive in a REST instruction conveyed in an HTTP (Hypertext Transfer Protocol) request, and wherein the method further comprises:

constructing the first query as a first query language instruction in accordance with the second interface protocol, the first query language instruction implementing the query description and specifying the first consistency level;

constructing the second query as a second query language instruction in accordance with the second interface protocol, the second query language instruction implementing the query description and specifying the second consistency level; and returning the second query response to the client machine in a response to the HTTP request.

19. The computer program product of claim 18, wherein the method further comprises:

receiving an update request from the client machine in accordance with the first interface protocol, the update request specifying a set of data to be written to the distributed database;

translating the update request into an update query in accordance with the second interface protocol; and submitting the update query to the distributed database.

20. The computer program product of claim 19, wherein the plausibility condition specifies any of the following:

an indicator of not-empty, wherein the plausibility condition is met when the first query response includes a value that is not empty;

a specified time, wherein the plausibility condition is met when the first query response includes a value having a timestamp more recent than the specified time; or a predetermined pattern of database field values, wherein the plausibility condition is met when the first query response includes a pattern of database field values that match the predetermined pattern of database field values.

* * * * *